Feb. 7, 1956  E. M. POLK  2,733,969
PACKING SEAL
Filed April 23, 1953
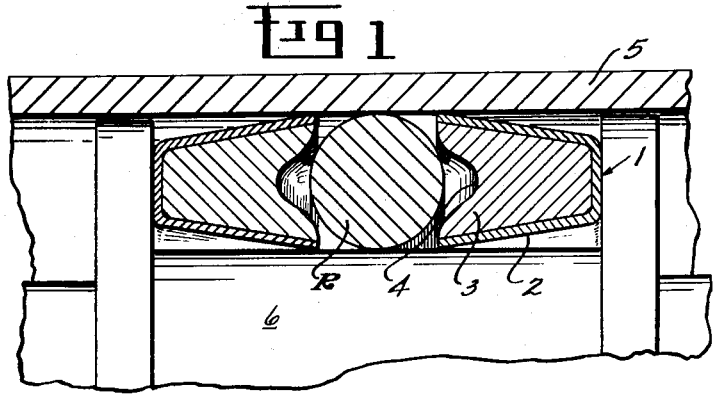
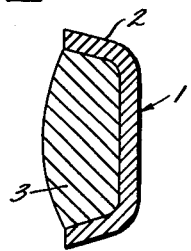 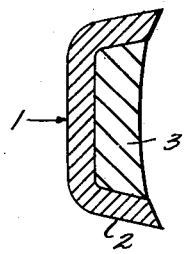 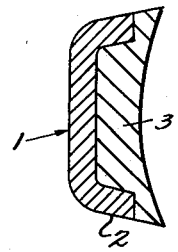
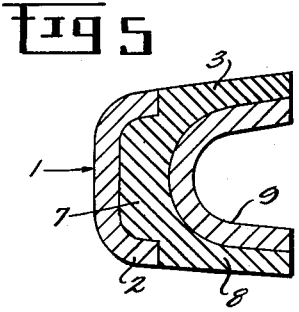
INVENTOR.
ELLSWORTH M. POLK
BY
ATTORNEYS United States Patent Office 2,733,969
Patented Feb. 7, 1956

2,733,969

PACKING SEAL

Ellsworth M. Polk, Dayton, Ohio

Application April 23, 1953, Serial No. 350,785

5 Claims. (Cl. 309—23)

(Granted under Title 35, U. S. Code (1952), sec. 266)

The invention described herein may be manufactured and used by or for the Government for governmental purposes without payment to me of any royalty thereon.

This invention relates to improved packing or sealing means, being directed to sealing means applicable between relatively moving members as well as static members. The packing or sealing means which is the subject of the invention may be used with or without an additional seal such as an O ring. The improved packing is so constructed and arranged to reduce friction and resulting wear thereon from moving parts, eliminate leakage of fluid under pressure, and prevent extrusion when used in conjunction with an additional seal such as an O ring.

The improved packing generally consists of an O ring and an annular cup member of moderately hard bearing material in conjunction with an insert seated in the cup member and connected thereto in any suitable fashion. The insert being of a generally elastomeric or plastic material which affords the pressure front of the packing. The cup member is diverging in cross-section and contains the insert to insure proper dispersal of pressure applied to the insert to maintain an effective substantially line contact seal whether used between relatively moving parts or static members and when used with an additional seal, the improved packing is effective to prevent extrusion of such seal.

Prior art shows generally the use of pressure or backing rings in conjunction with O rings, the backing being of a generally elastomeric material which is ineffective in itself to prevent rapid deterioration and wear of the seal with consequent rapid reduction in efficiency.

An object of this invention is to provide an improved packing or sealing means adapted for use between relatively movable members as well as static members which will reduce friction to a minimum and prevent extrusion and consequent deterioration and wear of the seal.

A further object of the invention is to provide an improved packing for use in conjunction with an O ring by combining a cup member of moderately hard bearing material and non-rectangular cross-section with an elastomeric core to serve as a non-extrusion device as well as an additional seal.

Another object of the invention is to provide an improved packing or sealing means for use between relatively movable members as well as static members comprising a retaining means of generally U-shaped cross-section having diverging side portions in conjunction with an insert of relatively firm yet flexible material whereby a line bearing contact seal is obtained between the improved packing and the relatively moving parts, increasing efficiency by reducing friction and decreasing deterioration of the seal.

Other objects and advantages of the invention will be readily apparent to those skilled in the art from consideration of the following specification in conjunction with the accompanying drawings wherein:

Fig. 1 shows a partial sectional view of a cylinder and piston head incorporating a preferred form of the improved packing or sealing assembly which is the subject of the invention.

Figs. 2-5 respectively show modified forms of the invention disclosed in Fig. 1.

The preferred form of the improved packing or sealing means as shown in Fig. 1 of the drawings consists of an O ring R and annular member 1 of moderately hard bearing material which is U-shaped in cross-section having a web portion and opposed leg portion 2, the leg portions 2 of the U being in diverging relation. The material employed for the annular member 1 may be any moderately hard nonextrudible bearing material with a low coefficient of friction and good wear resistant properties with sufficient flexibility for expansion of the U-shape. Examples of suitable bearing materials are phenolic, and bearing bronze. Mounted entirely within the cup of the annular member is an insert 3 of elastomeric or plastic material such as synthetic rubber, leather, nylon, Teflon or KE1-F, for example. The insert fills the cup with the exception of having a deep generally V-recess 4 therein at the open end of the cup and centrally thereof, the outer end of the recess or legs of the V are beveled so as to provide a streamlined surface with the legs 2 of the cup section. This formation provides extended legs on the cup for easy flexing thereof and the generally V-shaped recess in the insert provides extended pressure surface so that in application the fluid pressure as distributed on the insert through the O ring R will cause reaction on the legs of the cup to expand them so that they may make a substantially line contact seal between the cylinder wall 5 and piston head 6. This line contact seal will reduce the frictional losses inherent in known packing elements and will correspondingly increase efficiency and life of the packing. The employment of the cup of diverging cross-section also prevents extrusion of the O ring material between the cylinder wall and the cup. It is noted that this portion of the improved packing is readily usable in itself as an effective seal.

In Fig. 2 is a modified form of the packing which is the subject of this invention. The annular member or cup 1 of the packing shown is of material as indicated with respect to the cup shown in Fig. 1 and is of U-shape in cross-section with diverging legs 2. However, the legs are shorter in length. The insert 3 fills the space within the cup and has a uniform convex outer surface from the legs. The impact of pressure on the convex outer surface will obviously expand the legs 2 into bearing contact with the cylinder or housing preventing any extrusion or leakage therebetween and preserving the integrity of the insert with a minimum of wear to the non-extrusion unit.

It is noted that the particular function of the invention structure provides that the insert initially and substantially absorbs the applied pressure to flex the legs of the cup against the housing therefor resulting in an effective seal against leakage and prevents extrusion of the seal which may be used in conjunction therewith.

Fig. 3 discloses another modification of the invention comprising an annular member 1 of moderately hard bearing material and cup shaped in cross-section with diverging legs 2 and having an insert 3 therein substantially filling the cup to present a substantially planar pressure front. This form of the invention is comparable to that shown in Fig. 2 and is particularly adaptable for use as a seal in itself. The flexibility of the insert is effective on application of pressure to the insert to spring the cup legs to provide an effective seal and the type of moderately hard bearing material employed in the cup will result in a retaining of its shape by the cup member on application of pressure through the insert. This gives a minimum bearing surface to the packing with the obvious increase in efficiency and decrease in deterioration.

Another form of the invention is shown in Fig. 4 of the drawings. In this form the cup 1 U-shaped in cross section is employed but the legs 2 while diverging are shorter in length. The insert 3 herein forms an extension of the legs and has a concave surface therein to receive pressure resulting from a fluid. In this form of packing as in the preceding forms, there is a minimum of bearing by the non-extrusion unit on the cylinder wall due to the diverging nature of the outer wall of the packing as defined by the cup member 1 and the arrangement and design of the insert insures that the effect of pressure on the insert will expand the legs of the cup member so that such legs furnish a substantially straight line bearing surface of the packing on the cylinder or housing wall providing an efficient seal as well as preventing extrusion between said cup and the cylinder wall.

Another modification of the invention is shown in Fig. 5 of the drawings. An annular cup 1 of U-shape cross-section and moderately hard bearing material is employed similar to the cup in the species shown in Fig. 3 of the drawings, however the elastomeric or plastic insert 3 is also substantially U-shaped having a heel section 7 within the cup and having the legs 8 of the U form diverging extensions of the legs 2 of the cup 1. Mounted within and conforming to the interior surface of the insert 3 is a U-shaped spring member 9 which is coextensive with the legs 8 of the insert 3. The spring member 9 biases the insert legs outwardly and the diverging nature of the legs provides a minimum contact and bearing surface on the cylinder walls while presenting an efficient seal against leakage or extrusion between the improved packing unit and the cylinder wall.

As can be readily seen, each of the disclosed species of the invention employs a cup element of moderately hard bearing material having diverging leg members with a pressure receiving insert therebetween whereby the pressure on the insert will spring the cup member to efficiently seal the opening to which it is applied and the diverging nature of such legs provides a minimum straight line bearing surface with greater efficiency whether used with relatively moving parts or static members.

While various species of applicant's invention have been defined, other species and applications thereof will be readily apparent to those versed in the art and such lies within the scope of the invention as defined by the claims herein.

I claim:

1. A packing seal for use in conjunction with an O ring in an annular space between relatively moving parts comprising a cup element substantially U-shaped in cross-section and diverging towards the open end of the U, said cup element being flexible and formed of moderately hard nonextruding bearing material, an insert within said cup element substantially filling said cup element adapted to cooperate with the O ring, whereby on pressure application to the O ring being transmitted to said insert, said insert will act as a buffer to absorb and uniformally distribute the pressure to cause the cup element to flex to provide a substantially straight line seal between the relatively moving parts.

2. A hydraulic fluid pressure seal for relatively reciprocal parts adapted to be lodged in a ring groove in one of said parts comprising a resilient O ring having an initial cross-sectional diameter such that the ring is radially compressed into sealing contact with both parts when in use, said O ring made of a plastic rubber-like material, said fluid pressure seal further including a backup ring for said O ring to prevent extrusion of said O ring into the space between the reciprocal parts, the backup ring comprising an annular member of hard nonextrudible bearing material, said member U-shaped in cross-section, an elastomeric insert complementary in cross-section to the U-shape of the backup member, said elastomeric insert mounted wholly within said backup member whereby pressure exerted on the O ring forces it against the elastomeric material which expands the backup ring to form a high pressure low friction seal with the relatively reciprocal parts.

3. A hydraulic fluid pressure seal for relatively reciprocal parts adapted to be lodged in a ring groove in one of said parts, comprising a resilient O ring in said groove, said O ring having an initial cross-sectional diameter such that the O ring is radially compressed into sealing contact with both parts, said O ring made of a plastic rubber-like material, said fluid pressure seal further including a backup ring for said O ring to prevent extrusion of said O ring into the clearance space between the reciprocal parts, the backup ring comprising an annular member of hard nonextrudible bearing material, the cross-section of said member comprising a web portion and connected diverging side portions, an elastomeric insert complementary in cross-section to the shape of the cross-section of the backup ring, said elastomeric insert mounted entirely within said backup ring whereby pressure on the O ring forces the O ring against the elastomeric material which expands the backup ring to form a high pressure low friction seal with the relatively reciprocal parts.

4. A hydraulic fluid pressure seal for relatively reciprocal parts adapted to be lodged in a ring groove in one of said parts comprising a resilient O ring in said groove, said O ring having an initial cross-sectional diameter such that the O ring is radially compressed in sealing contact with both parts, said pressure seal further including a backup ring, said backup ring having a cross-section including a web portion and diverging side portions, the radial length of the web portion of said backup ring being substantially less than the depth of the ring groove in one of the reciprocal parts, an elastomeric insert having a cross-section complementary in shape to the cross-section of the backup ring mounted wholly within the backup ring, said O ring under pressure adapted to be forced against the elastomeric material in the backup ring forcing the opposed diverging side walls of the backup ring into a sealing line contact with the relatively reciprocal parts to provide a high pressure, low friction seal.

5. A hydraulic fluid pressure seal for relatively reciprocal parts comprising an annular member of hard nonextrudible bearing material, said member having a cross-section including a central web portion and opposed diverging side portions, an elastomeric insert having a cross-section including a central web portion and connecting diverging side portions, the web portion of said elastomeric insert having a boss complementary in shape to the cross-section of said annular member, said elastomeric insert mounted in said backup member, the opposed diverging side walls of said elastomeric insert shaped to form an extension of the opposed diverging side walls of said annular member, an annular U-shaped spring member mounted within the opposed diverging side walls of the elastomeric insert, said spring member acting to maintain the side walls of the elastomeric material in sealing engagement with the relatively reciprocal parts.

References Cited in the file of this patent

UNITED STATES PATENTS

| | | |
|---|---|---|
| 48,098 | Rowe | June 6, 1865 |
| 994,558 | Aspinwall | June 6, 1911 |
| 1,945,524 | Foehr | Feb. 6, 1934 |
| 1,955,157 | Wayne | Apr. 17, 1934 |
| 2,059,729 | Dick | Nov. 3, 1936 |
| 2,081,040 | King | May 18, 1937 |
| 2,297,396 | Farina | Nov. 13, 1939 |
| 2,456,356 | Aber | Dec. 14, 1948 |
| 2,494,598 | Waring | Jan. 17, 1950 |
| 2,533,531 | Stephens | Dec. 12, 1950 |
| 2,658,809 | Schultz | Nov. 10, 1953 |
| 2,705,177 | Waring | Mar. 29, 1955 |

FOREIGN PATENTS

| | | |
|---|---|---|
| 606,001 | Great Britain | Aug. 4, 1948 |